United States Patent [19]
Batt

[11] Patent Number: 5,768,764
[45] Date of Patent: Jun. 23, 1998

[54] STEEL BEAD WIRE EXTRACTING MACHINE FOR TIRES

[76] Inventor: Bernard E. Batt, 11545 TerraBella Blvd., Plantation, Fla. 33325

[21] Appl. No.: 636,181

[22] Filed: Apr. 22, 1996

[51] Int. Cl.⁶ .................................................. B23P 19/00
[52] U.S. Cl. .......................... 29/700; 29/426.4; 29/426.5; 225/93
[58] Field of Search .................................. 29/283, 403.3, 29/426.5, 700, 802, 426.4; 225/93; 157/13; 241/DIG. 31

[56] References Cited

U.S. PATENT DOCUMENTS

| | | | |
|---|---|---|---|
| 3,733,941 | 5/1973 | Geyer, Jr. ....................................... | 82/59 |
| 3,838,492 | 10/1974 | Uemura . | |
| 4,072,072 | 2/1978 | Harb ............................................... | 82/86 |
| 4,417,492 | 11/1983 | Winecoff ........................................ | 82/46 |
| 4,486,255 | 12/1984 | Crommelynck et al. .................. | 156/98 |
| 4,770,077 | 9/1988 | Garmeter .................................... | 83/173 |
| 4,825,926 | 5/1989 | Crommelynck et al. .................. | 157/13 |
| 5,147,163 | 9/1992 | Booker et al. ............................ | 409/199 |
| 5,319,834 | 6/1994 | Voights ............................... | 29/426.4 X |

*Primary Examiner*—S. Thomas Hughes
*Attorney, Agent, or Firm*—Oltman, Flynn & Kubler

[57] ABSTRACT

Device for removing bead wires from the side rims of vehicle tires. The device has a rectangular standing frame with a central portion having pivotable rods that support a tire. Opposite sides of the tire have main pull chains each rotating about sprockets and each chain having bar hooks attached thereon. An electric or gasoline motor rotates a drive shaft which has ends connected to reduction pulley and sprocket sets to each of the main chains so that the motor causes the main pull chains to rotate in opposite directions causing the hooks to pull bead wires from the tire. Sliding bars on opposite sides of the tire continuously center and control the removal of the bead wires as they are being pulled from the tire by the hook bars.

16 Claims, 5 Drawing Sheets

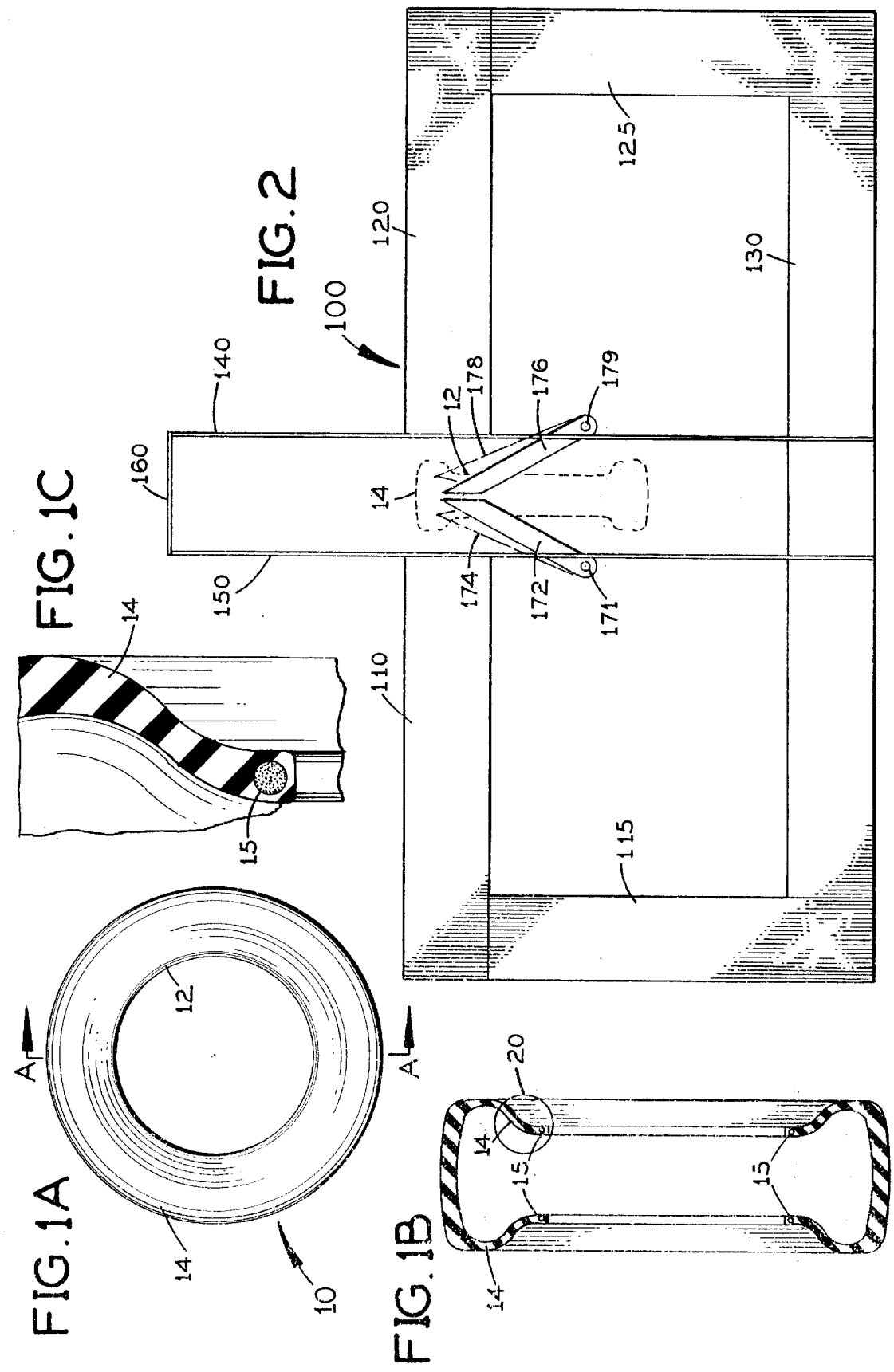

STEEL BEAD WIRE EXTRACTING MACHINE FOR TIRES

This invention relates to a wire extracting machine, and in particular to an apparatus for extracting the steel bead wires from vehicle tires in order to allow the tires to be recycled.

BACKGROUND AND PRIOR ART

Automotive tires when worn out are ripe for recycling. The combination of the enormous number of used vehicle tires and the problems of disposal, have made it necessary to devise ways to recycle the great quantities of rubber. For recycling, the tires must be chopped or ground into small pieces for processing. Before this step, the steel bead wires imbedded in the tire in the area adjacent to the wheel rim must be removed. Currently, there are no efficient and practical devices for separating the rubber from these steel bead wires.

Several U.S. patents relate to the recycling of used tires by cutting up the rubber itself but still do not adequately solve the above referred problems. See U.S. Pat. Nos. 3,733,941 to Geyer; 4,072,072 to Harb; 4,417,492 to Winccoff; 4,486,255 to Crommelynck et al.; 4,770,077 to Garmater; 4,825,926 to Crommelynck et al.; and 5,147,163 to Booker et al.

SUMMARY OF THE INVENTION

The first objective of the present invention is to provide an apparatus for the automatic removal of steel bead wires from rubber tires.

The second object of this invention is to provide an apparatus to simultaneously remove the bead wires from both sides of a tire.

The third object of this invention is to provide an apparatus that allows for separating the rubber from the bead wires in a tire.

A preferred embodiment includes a main rectangular frame with pivotable bars for mounting a tire, a first chain positioned in the frame to one side of the tire having a first set of equally spaced bars each having trailing hook ends attached some ten inches behind, a second chain positioned in the frame to a second side of the tire opposite to the one side, the second chain having a second set of equally spaced bars each having trailing hook ends attached some ten inches behind, whereon rotating the first chain and the second chain simultaneously causes the moving hook ends to remove bead wires from the tire. Both the chains are mounted and supported by respective pairs of main drive sprockets. The embodiment further includes pivotable rods with ends movable from a retracted position to an engaged position for supporting the tire. The frame further includes a first wall fence separating the first chain from the one side of the tire, the first wall fence having an opening for allowing the first set of hook end bars to pass therethrough, and a second wall fence separating the second chain from the second side of the tire, the second wall fence having an opening for allowing the second set of hook end bars to pass therethrough. Each fence wall has a sliding bar for continuously centering and positioning the bead wires being pulled through a first wall fence opening. The main sprockets and chains are connected to a gasoline or electric motor through reduction pulleys and sprockets.

In operation, one link on each pull chain has a pull bar with a hook attached to pull the bead wire through a specially-shaped hole in a face plate. The hook trails approximately ten inches behind the point of attachment to the chain. As the chain rotates, each hook pulls its bead wire through the hole in its face plate.

After the pull bar/hook passes through the face plate, a roller wheel properly positioned on the side of the pull chain engages a push rod/linkage to move a sliding bar into position to close the opening in the bottom of the face plate to prevent the bead wires from improperly exiting the hole in the bottom of the face plate. The tire remains between the face plates until the bead wires are completely stripped from the tire.

After the bead wires are stripped from the tire, the path of the hooks passing around the outer sprockets will discard the bead wires at each end of the machine. Another roller wheel(not shown) properly positioned on the side of the pull chain, will engage a push rod/linkage to move the sliding bar away from the hole in the bottom of the face plate to permit the hook to pass through the face plate on the next cycle. The tire is now removed and the cycle is repeated for the next tire.

Further objects and advantages of this invention will be apparent from the following detailed description of a presently preferred embodiment which is illustrated schematically in the accompanying drawings.

BRIEF DESCRIPTION OF THE FIGURES

FIG. 1A is a side view of a rubber tire to be used with the subject invention.

FIG. 1B is a cross-sectional view of the tire of FIG. 1A along arrow A.

FIG. 1C is an enlarged view of a portion of FIG. 1B.

FIG. 2 is a side exterior view of the exterior frame with the wheel-tire supports.

DESCRIPTION OF THE PREFERRED EMBODIMENT

Figure 3:
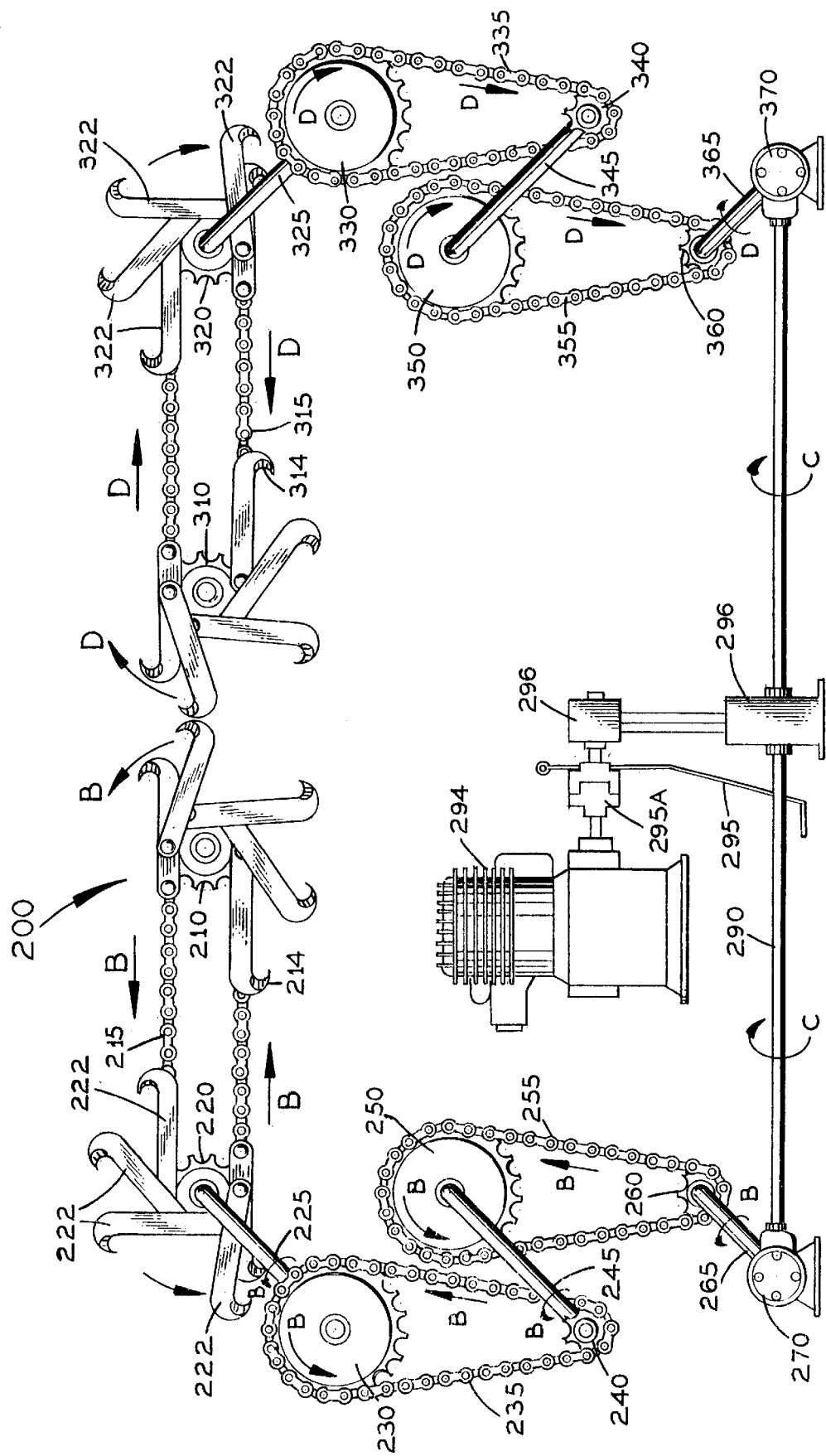
FIG. 3 is a side exterior view of the pull bar/hook arrangement with sprockets and speed reduction components of the subject invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

FIG. 1A is a side view of a traditional rubber tire 10. FIG. 1B is a cross-sectional view of the tire 10 of FIG. 1A along arrow A. FIG. 1C is an enlarged view of a portion 20 of FIG. 1B. Referring to FIGS. 1A–1C, tire 10 includes a rubber wheel rim portion 12, and a main cylindrical rubber tire area 14 having bead wires 15 imbedded therein adjacent to rim portion 12.

FIG. 2 is a side exterior view of the exterior main frame 100 that includes left main beam 110 connected at one end to a vertical left end beam 115 which is connected at an opposite end to a bottom beam 130 which is connected to a vertical right end beam 125 which in turn is connected to a horizontal right main beam 120. A right fence wall 140 abuts against the right main beam 120 and a left fence wall 150 abuts against left main beam wall 110 with a top plate cover 160 located thereon. Dual pairs of pivoting wheel supports 172, 174 and 176, 178 rotatably pivot out from fence walls 140 and 150 along pivot point 171, 179 to support tire 14 along rim portion 12. Note that only a cross-section area of tire 14 is shown. The beams 110, 115, 120, 125, 130, can be formed from material such as but not limited to 8 inch by 8 inch "W steel beams" and the like. Their ends can be connected together by means such as but not limited to welding, soldering, bolts and the like. The fence walls 140, 150 and top plate 160 can be formed from but not limited to ¼ inch plate steel and the like.

FIG. 3 is a side exterior view of the pull bar/hook arrangement 200 with sprockets and reduction pulleys of the subject invention. Referring to FIG. 3, drive motor 294, such as but not limited to a sixteen horsepower gasoline motor, a three phase AC 10 horsepower motor, is connected through a reduction gear box/clutch 295A with manual clutch actuating arm 295 drives speed reduction components 296 to drive shaft 290 to rotate clockwise in the direction of arrow C. A bevel gearbox 270 connects drive shaft 290 to a perpendicularly positioned axle 265 which rotates counter-clockwise in the direction of arrow B and is connected to a lower inner sprocket 260 that in turn rotates inner chain 255 causing upper inner sprocket 250 to rotate in the direction of arrow B(first reduction pulley). Upper inner sprocket 250 is connected by another horizontal axle 245 to rotate in the direction of arrow B causing lower outer sprocket 240 to turn chain 235 to rotate upper outer sprocket 230(second reduction pulley) which in turn causes a main drive axle 225 to rotate in the direction of arrow B along with first left main beam sprocket 220. The rotation of first left main sprocket 220 causes left main pull chain 215 to rotate in the direction of arrow B. Second left main sprocket 210 is freely fastened to move when chain 215 rotates. Pull bar 214, has a hook connected to an individual link in left pull chain 215. The pull bar 214 rotates in the direction of arrow B so that its respective hook end trails approximately 10 inches behind its attachment points to left pull chain 215. A similar pull bar 222, has a respective hook end attached at an opposite location along left pull chain 215.

The right side of FIG. 3 shows a main right pull chain 315 pull hook bars 314, 322, in an opposite direction along arrow D. Similar to the operation of the left side of FIG. 3, drive motor and gears 294, 296 drives shaft 290 to rotate clockwise in the direction of arrow C. Bevel gearbox 370 connects drive shaft 290 to a perpendicularly located horizontal axle 365 which rotates clockwise in the direction of arrow D and is connected to a lower inner sprocket 360 that in turn rotates inner chain 355 causing upper inner sprocket 350 to rotate in the direction of arrow D(first reduction pulley). Upper inner sprocket 350 is connected by another horizontal axle 345 to rotate in the direction of arrow D causing lower outer sprocket 340 to turn chain 335 to rotate upper outer sprocket 330(second reduction pulley) which in turn causes another main drive axle 325 to rotate in the direction of arrow B along with first left main beam sprocket 320. The rotation of first left main sprocket 320 causes left main pull chain 315 to rotate in the direction of arrow D. Second left main sprocket 310 is freely fastened to move when chain 315 rotates. Pull bars 314,has a hook connected to an individual link in right pull chain 315. The pull bar 314, rotates in the direction of arrow D so that its respective hook end trails approximately 10 inches behind its attachment points to right pull chain 315. A similar pull bar 322, has a hook end attached at an opposite location along left pull chain 215.

Figure 4:
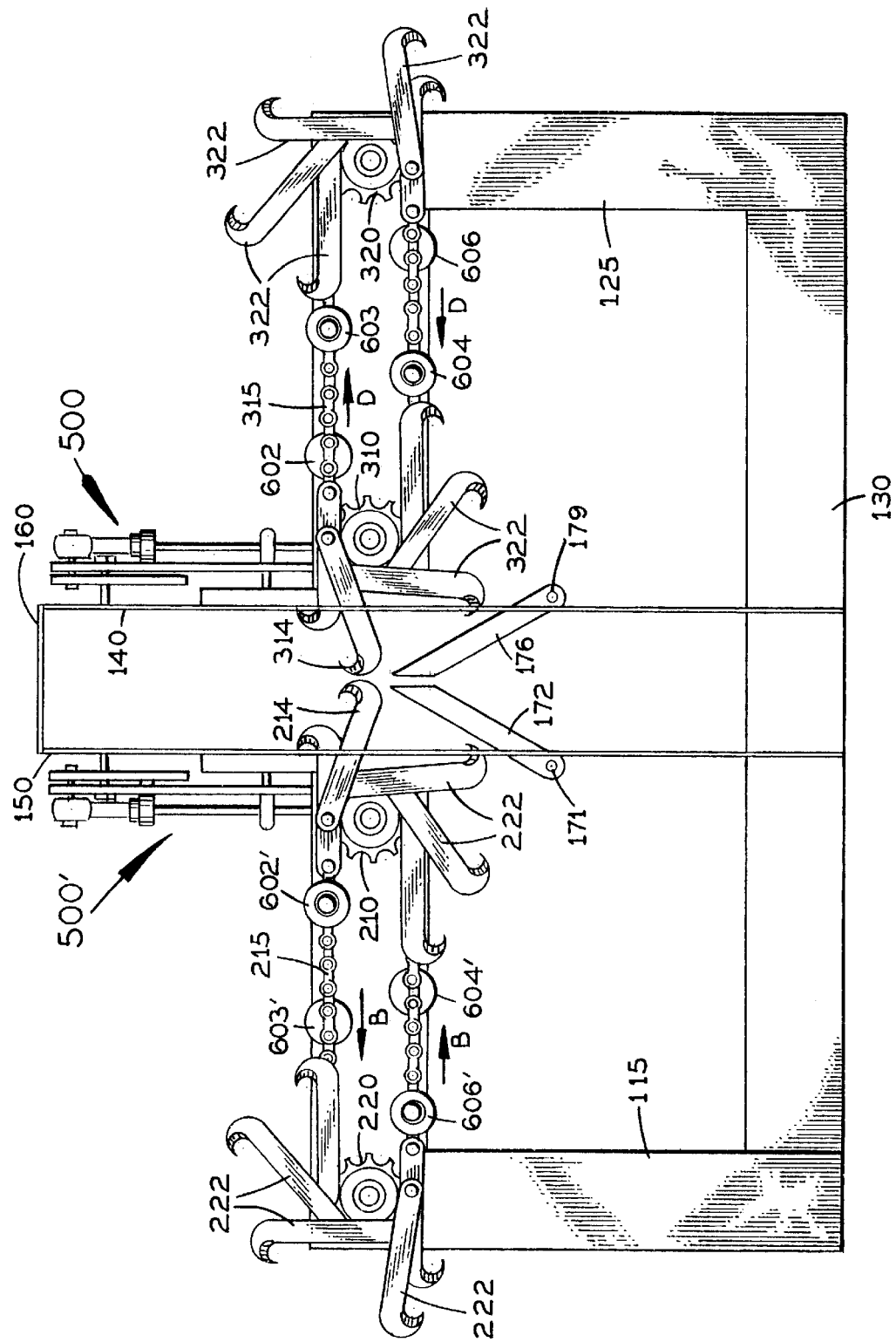
FIG. 4 is a side exterior view of the invention combining FIGS. 2 and 3.

FIG. 4 is a side exterior view of the invention combining FIGS. 2 and 3. Note that sprockets 230, 250, 330, 350 and related components are not shown in FIG. 4. Component 500 is shown and described in more detail in reference to FIGS. 5–7.

Figure 5:
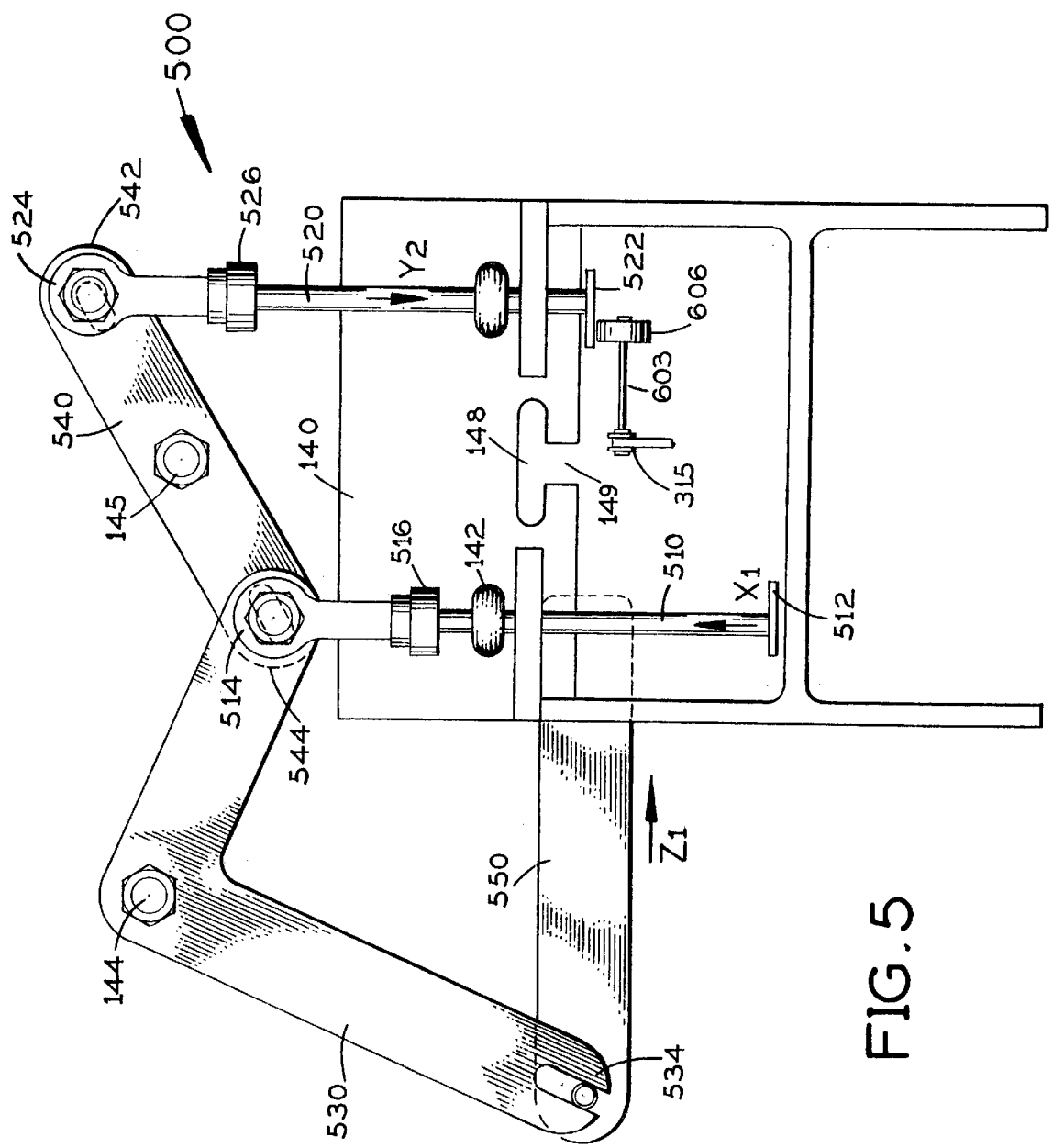
FIG. 5 is an enlarged end view of the sliding bar of FIG. 4 along arrow G with the sliding bar in a retracted position.
Figure 6:
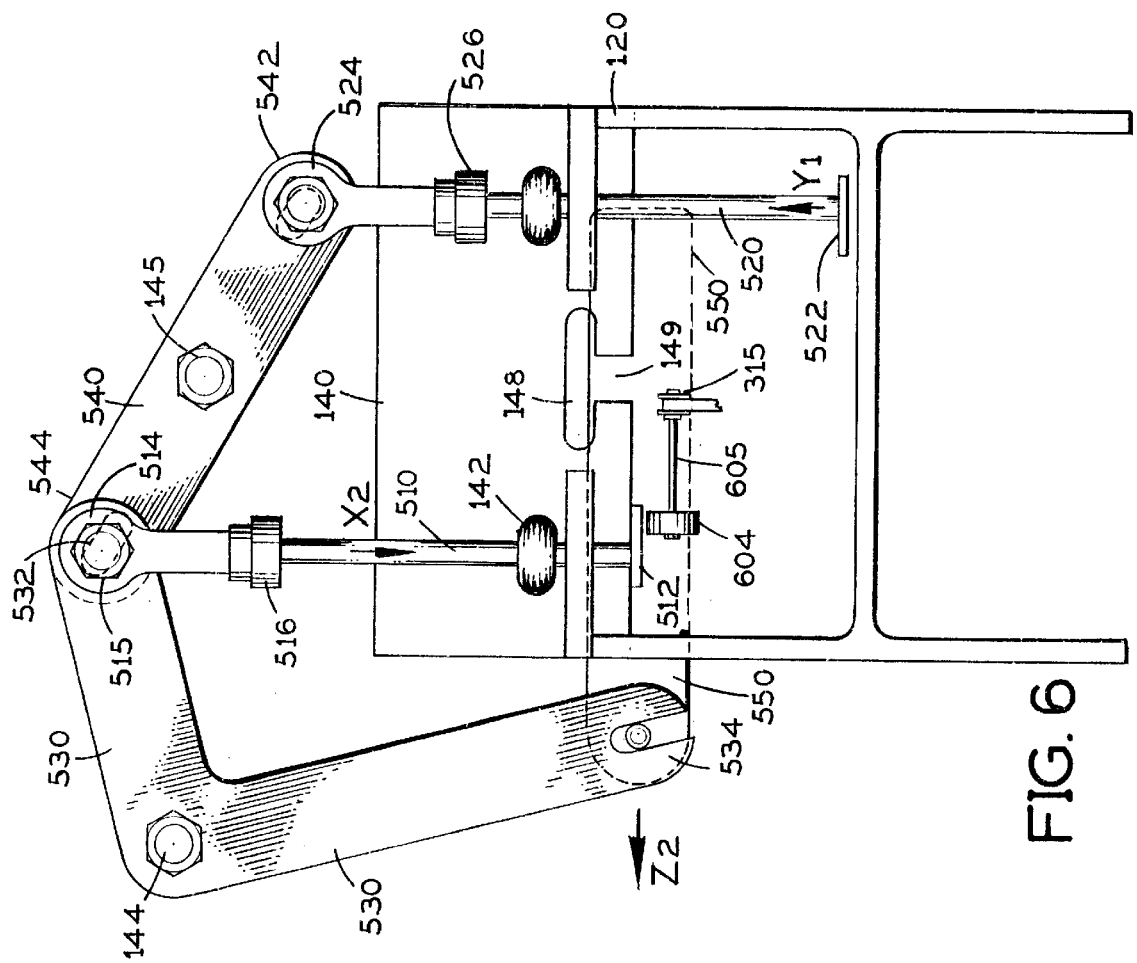
FIG. 6 shows the sliding bar of FIG. 5 in an engaged position.
Figure 7:
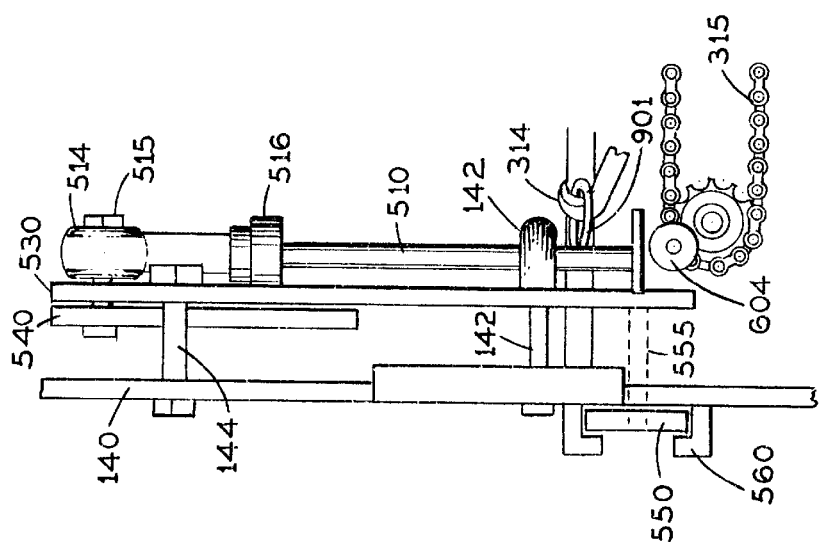
FIG. 7 is a side view of the sliding bar of FIG. 6 along arrow H.

FIG. 5 is an enlarged end view of the sliding bar of FIG. 4 along arrow G with the sliding bar in a retracted position. FIG. 6 shows the sliding bar of FIG. 5 in an engaged position. FIG. 7 is a side view of the sliding bar of FIG. 6 along arrow H. Referring to FIGS. 5–7, sliding bar 500 includes fence wall 140 which supports a face plate 560 that has a horizontal opening 148 and a lower opening 149 which form a general "T" shape to allow for hook ends(See 312 FIG. 7) with bead wire to pass therethrough. Horizontal supports 142(other side not shown) connect fence wall 140 to reciprocating shafts 510, 520 by couplers 142 and 148. Shafts 510, 520 have stop rings 516, 526 which limit the distance shafts 510, 520 travel. Shaft 520 has a foot end 522 and a pivot end 524 which is pivotally connected by a bolt, screw and the like to end 542 of horizontal bar 540 which is connected to fence wall by rotating about bolt 145. Opposite end 544 of bar 540 is rotatably connected by bolt 515 to U shaped open end 532 of L actuating link 530 and to upper end 514 of shaft 510. L actuating link is rotatably connected by bolt 144 to fence wall 140 and has lower U shaped open end 534 connected by bolt 555 to one end of sliding bar 550. Note that sliding bar 550 slides within face plate 560. Referring to FIG. 4, main chain 315 includes four external roller wheels 602, 604, 606, 608 which are mounted by extension axles (only roller wheel 603 and extension axle 605 are shown in FIG.5, 6) to chain links 315.

The operation of the sliding bar assembly 500 will now be discussed in reference to FIGS. 4–7. After hook end 314 pulls bead wire 901 through the T shaped opening 148, 149, approximately four inches the roller wheel 604 contacts foot end 512 to raise shaft 510 in the direction of arrow X1 (Ref. FIG. 5) causing sliding bar 550 to slide in the direction of arrow Z1 and shaft 520 to move in the direction of Y2. In the closed position bar 550 closes off the stem vertical opening 149 which forces the pulled bead wire 901 to be centered and positioned only in the horizontal opening 148. Chain 315 continues rotating in the direction of arrow D moving another roller wheel 606 which then contacts the foot end 522 causing shaft 520 to rise vertically in the direction of arrow Y1 moving shaft 510 in the direction of arrow X2 which causes sliding bar to move in the direction of arrow Z2 opening the lower vertical opening 149. Note that both openings 149 must be in an open position in order to allow for the hook bars and their respective hook ends to pass therethrough. Other roller wheels 602 and 608 function similarly. For hook 322 the other main chain 215 includes like sliding bar assembly 500' and wheels 602', 604', 606' and 608' which function in a similar manner, for hooks 214 and 222. Note that hook 214 on the left and hook 314 on the right, pulls the beads from a tire 14. The clutch lever 295(see FIG. 3) disengages clutch 295A, chains 215,315 and remaining moving parts stop(with the exception of drive motor 294). After next tire 14,(FIG. 2) is put in position actuating clutch lever 295 engages clutch 295A to start chains 215, 315. Left hook 222 and right hook 322 pulls the beads therefrom.

Although the preferred embodiment describes removing bead wires, the invention can be used for removing other types of reinforcing elements such as but not limited to steel wires, steel cords from the belts of rubber tires and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An apparatus for removing bead wires from tires comprising:
    a main frame having means for mounting a first tire;
    a first chain positioned in the frame to one side of the tire having a first hook and a second hook attached thereon; and
    a second chain positioned in the frame to a second side of the tire opposite to the one side, the second chain having a first hook and a second hook attached thereon, wherein rotating the first chain and the second chain simultaneously causes the first hook on the first chain and the first hook on the second chain to remove bead wires from the first tire, and wherein rotating the first chain and the second chain simultaneously causes the second hook on the first chain and the second hock on the second chain to remove bead wires from a second tire.

2. The apparatus for removing bead wires from tires of claim 1, wherein the mounting means includes:
    pivotable rods with ends movable from a retracted position to an engaged position for supporting the first tire and for spreading the bead wires in the first tire to allow the first and the second hooks to enter behind the bead wires.

3. The apparatus for removing bead wires from tires of claim 1, wherein the frame includes:
    a first pair of sprockets for supporting the first chain;
    a second pair of sprockets for supporting the second chain.

4. The apparatus for removing bead wires from tires of claim 1, wherein the first hook and the second hook of the first chain include:
    a first set of pull bars each having one end attached to a link in the first chain, and an opposite end having a hook.

5. The apparatus for removing bead wires from tires of claim 4, wherein the first hook and the second hook of the second chain include:
    a second set of pull bars each having one end attached to a link in the second chain, and an opposite end having a hook.

6. The apparatus for removing bead wires from tires of claim 1, wherein the first set of equally spaced bars and the second set of equally spaced bars includes:
    the hook ends trailing approximately ten inches behind the attached ends.

7. The apparatus for removing bead wires from tires of claim 1, wherein the frame includes:
    a first wall fence face plate separating the first chain from the one side of the tire, the first wall fence face plate having an opening for allowing the first hook to pass therethrough.

8. The apparatus for removing bead wires from tires of claim 7, wherein the frame includes:
    a second wall fence face plate separating the second chain from the second side of the tire, the second wall fence face plate having an opening for allowing the second hook to pass therethrough.

9. The apparatus for removing bead wires from tires of claim 7, wherein the frame further includes:
    a first sliding bar for continuously centering and positioning the bead wires being pulled through the first wall fence face plate opening.

10. The apparatus for removing bead wires from tires of claim 9, wherein the frame further includes:
    a second sliding bar for continuously centering and positioning the bead wires being pulled through the the second wall fence face plate opening.

11. The apparatus for removing bead wires from tires of claim 1, further comprising:
    a motor for driving a reduction gear box, clutch and a drive shaft, the drive shaft having first and second ends;
    a first reduction pulley and sprocket set attached between the drive shaft first end and the first chain;
    a second reduction pulley and sprocket set attached between the drive shaft second end and the second chain, wherein operating the motor rotates the drive shaft causing the first reduction pulley and sprocket set and the first chain to rotate in an opposite direction from the second reduction pulley and sprocket set and the second chain.

12. An apparatus for removing left and right bead wires from tires comprising:
    a main frame having means for mounting a tire;
    a first chain positioned in the frame to one side of the tire having a first set of pull bars each having an attached end and a trailing hook end attached thereon;
    a second chain positioned in the frame to a second side of the tire opposite to the one side, the second chain having a second set of pull bars each having a trailing hook end attached thereon, whereon rotating the first chain and the second chain simultaneously causes the moving hook ends to remove bead wires from the tire;
    pivotable rods with ends movable from a retracted position to an engaged position for supporting the tire and for spreading the left and the right bead wires to allow the hook ends to enter behind the bead wires.

13. The apparatus for removing bead wires from tires of claim 12, wherein:
    the hook ends are trailing approximately ten inches behind the attached ends.

14. The apparatus for removing bead wires from tires of claim 12, wherein the frame includes:
    a first wall fence face plate separating the first chain from the one side of the tire, the first wall fence face plate having an opening for allowing the first pull bar hook end to pass therethrough; and
    a second wall fence face plate separating the second chain from the second side of the tire, the second wall face plate having an opening for allowing the second pull bar hook end to pass therethrough.

15. The apparatus for removing bead wires from tires of claim 14, further comprising:

a first sliding bar for continuously centering and positioning the bead wires being pulled through a first wall fence face plate opening; and a second sliding bar for continuously centering and positioning the bead wires being pulled through a second wall fence face plate opening.

16. The apparatus for removing bead wires from tires of claim 12, further comprising:

a motor for driving a reduction gear box and clutch and drive shaft, the drive shaft having first and second ends;

a first reduction pulley and sprocket set attached between the drive shaft first end and the first chain;

a second reduction pulley and sprocket set attached between the drive shaft second end and the second chain, wherein operating the motor rotates the drive shaft causing the first reduction pulley and sprocket set and the first chain to rotate in an opposite direction from the second reduction pulley and sprocket set and the second chain.

\* \* \* \* \*